Figure 1:
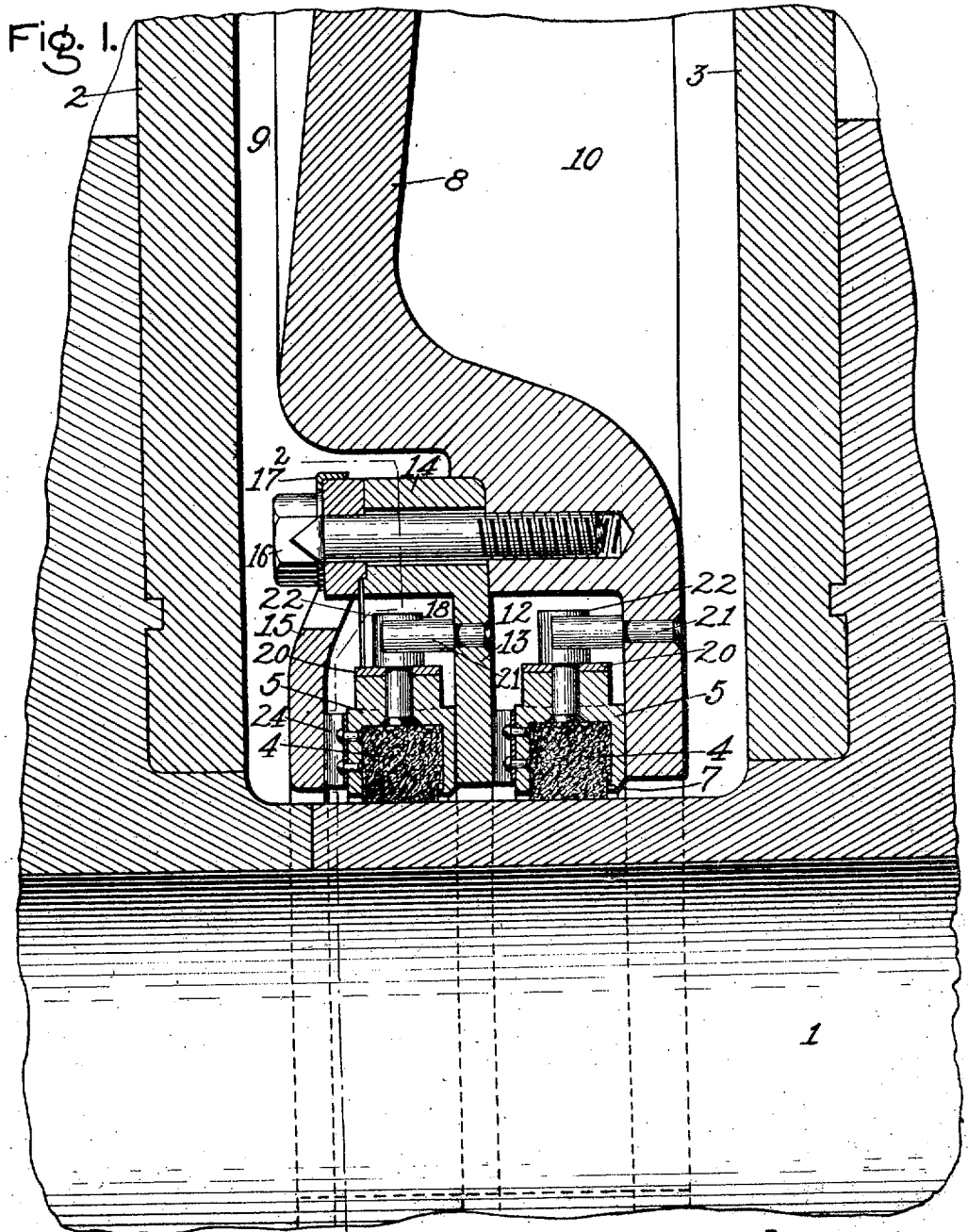

F. R. C. BOYD.
LEAKAGE REDUCING MEANS FOR TURBINES.
APPLICATION FILED MAR. 25, 1909.

969,517.

Patented Sept. 6, 1910.
2 SHEETS—SHEET 1.

Witnesses:

Inventor,
Frederic R. C. Boyd,
by Atty.

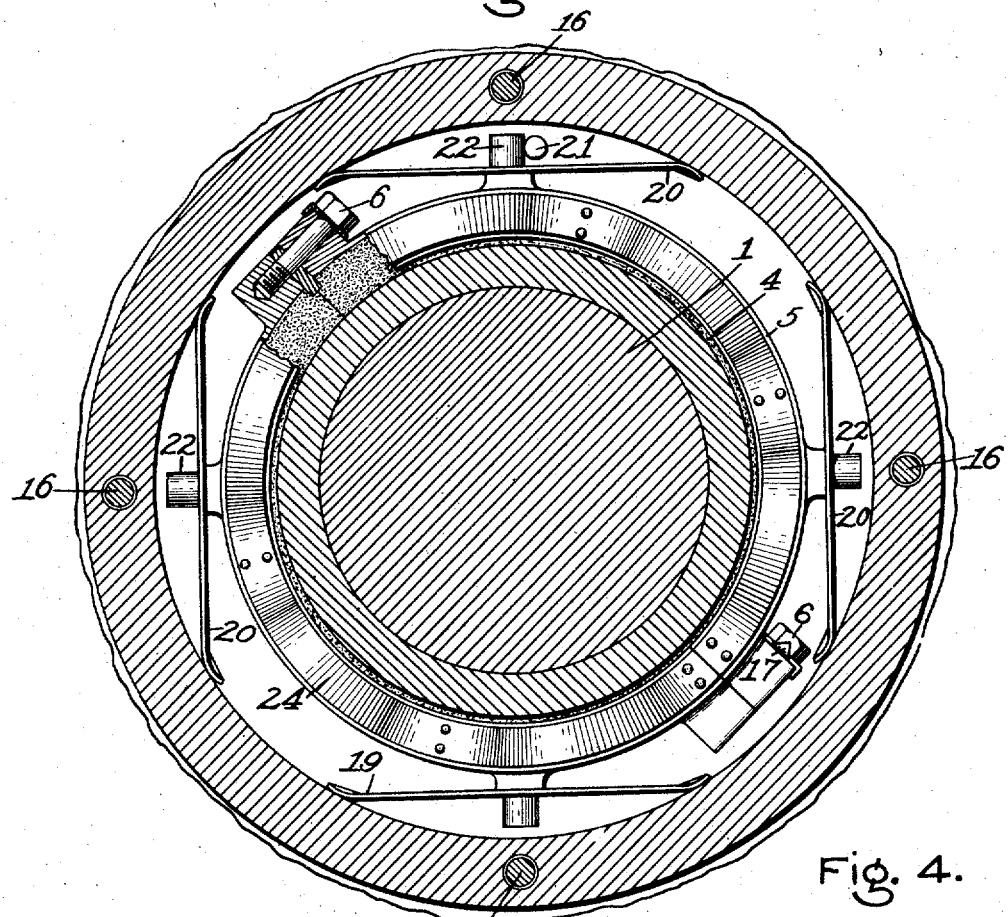
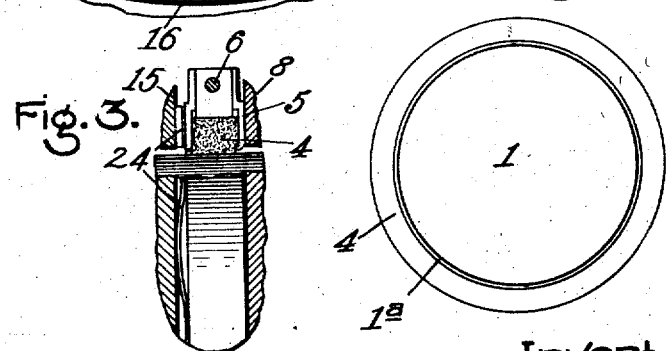

UNITED STATES PATENT OFFICE.

FREDERIC R. C. BOYD, OF LYNN, MASSACHUSETTS, ASSIGNOR TO GENERAL ELECTRIC COMPANY, A CORPORATION OF NEW YORK.

LEAKAGE-REDUCING MEANS FOR TURBINES.

969,517.   Specification of Letters Patent.   Patented Sept. 6, 1910.

Application filed March 25, 1909. Serial No. 485,782.

*To all whom it may concern:*

Be it known that I, FREDERIC R. C. BOYD, a citizen of the United States, residing at Lynn, county of Essex, State of Massachusetts, have invented certain new and useful Improvements in Leakage-Reducing Means for Turbines, of which the following is a specification.

The present invention relates to leakage reducing means for elastic fluid turbines, and more especially to those located between stages of a multi-stage turbine.

For a consideration of what I believe to be novel and my invention, attention is directed to the accompanying description and claims appended thereto.

In the drawings which illustrate one of the embodiments of my invention, Figure 1 is an axial section of a part of a multi-stage turbine; Fig. 2 is a cross-section of the same taken on line 2—2 of Fig. 1; Fig. 3 is a detail view showing the friction means for holding the packing after it has been moved perpendicularly to the shaft axis; and Fig. 4 is a detail view showing diagrammatically and on an enlarged scale the clearance between a packing ring and the shaft or rotor.

1 indicates the horizontal shaft to be packed and 2 and 3 bucket wheels mounted thereon. In this embodiment of the invention the packing surrounds and coöperates with the hub of one of the wheels to reduce leakage at this point, but where the hub is short, it can coöperate with the shaft instead, the principle being the same in both cases. Owing to the construction and nature of the turbine, the packing must be located wholly within the wheel casing and where it cannot be inspected, adjusted or renewed without taking the machine down, wholly or in large part. For this reason I do not consider it advisable or desirable to have the packing make rubbing contact with the moving part, but aim to separate the relatively movable elements by a small space or clearance. In other words, the structural embodiment of my invention instead of being a leakage preventing device, such as the ordinary soft packing and adjustable gland, or a divided packing ring where the segments are individually movable, is more strictly speaking a leakage reducing device. The clearance between fixed and moving parts should be as small as possible consistent with satisfactory operation. Preferably this clearance should be at least equal to the clearance between the wheel shaft and its bearings, and may be somewhat greater if occasion demands. For a 500 kilowatt turbine this clearance may with advantage be from .010″ to .020″ of an inch.

The packing proper is composed of a ring 4 made in two or more segments firmly held in a holder 5. The ends of the segments abut and there is no tendency for one to move toward or away from the shaft independently of the other. In other words, the segments are arch bound with a small clearance 1ª, Fig. 4, between the bore and hub or shaft to be packed. The ring may with advantage be made of carbon, although other materials having the proper characteristics may be substituted therefor. It is desirable but not essential to heat and then shrink the holder on the ring segments. For this reason the holder is made in two parts split axially and united by bolts 6, Fig. 2. It is also provided with a small shoulder 7, shown somewhat enlarged in Fig. 1 to assist in securing the parts. Very little of the packing ring is exposed when mounted in the holder. This is done to prevent particles of carbon or other substance forming the ring, and of any substantial size, from being detached from the ring in case of accident and passing with the steam into the adjacent stage of the turbine. The rings, of which there may be one, two or more, two usually being sufficient, are mounted in chambers formed in the split diaphragm 8 or in some part or parts carried thereby. In the wheel chamber 9 the pressure is higher than in the wheel chamber 10 and hence steam leaks from the former to the latter. The diaphragm is cut away to form a chamber 12 for the low pressure packing ring. Mounted on the high pressure side of the diaphragm is a plate 13 having an annular flange 14. To this flange is secured a disk 15. Bolts 16 serve to secure the disk and flanged plate to the diaphragm. A thin piece of sheet metal 17, when bent up against the head, serves to prevent the bolts from working loose. Between the disk and plate is a chamber 18 for the high pressure packing ring.

As this packing is intended more especially for horizontal shaft machines, it is evident that the weight thereof would cause the ring to rest on the upper side of the shaft unless special means are employed to prevent it. Referring to Fig. 2 a description of such a means will be given. Located under the ring and fastened to its holder is a flat spring 19 having curved ends that engage the adjacent annular wall of the packing chamber. The tension on this spring should be sufficient to support the weight of the packing ring and its holder and maintain the same clearance above and below the shaft. It is desirable to utilize other springs 20 which have a tendency to center the packing ring and at the same time eliminate as far as possible the tendency of the ring to move too far in any direction. Where such springs are employed the initial tension on the lower spring 19 must equal that of the upper spring plus an amount sufficient to sustain the weight of the ring and its holder and maintain the clearance around the shaft. To prevent the ring from turning, a stud 21 is provided against which a radial pin 22 strikes. In case the lower spring should break, the packing ring would or might drop on the shaft and the latter would gradually wear an elliptical hole in said packing ring until the clearance and the resultant leakage would become excessive. Owing to the fact that these packings are out of sight and access thereto can only be had by taking down the machine, it is evident that this state of affairs might continue for a period of time measured by years without discovery, the leakage growing steadily greater. To limit the leakage which would be occasioned by the above mentioned condition, other radial pins 22 are provided that are separated from the annular wall of the packing chamber by a small clearance but one greater than the normal clearance of the machine. This means that provision is made for a restricted minimum leakage through the clearance and that provision is also made for preventing said leakage from exceeding a predetermined maximum. I prefer to make the working clearance as small as possible consistent with successful operation, and to this end make the carbon or other rings fit the shaft more or less closely at the start and then rotate the shaft to cut or wear away the rings, thereby causing the machine to determine its own clearance.

A horizontal turbine is open to certain peculiarities that must be taken into account. The shaft is supported from the base or bed plate by two pillow blocks that are maintained comparatively cool, and hence do not expand and contract to any appreciable extent. The casing on the other hand is supported by the same base and as it is subjected to wide changes in temperature due to load changes on the turbine, it will expand and contract to a considerable extent and hence will move up and down and sidewise by an amount determined by the temperature changes. This movement is not great but it has to be provided for with just as much certainty as though the movement was much greater. The movement of the casing in a certain type of machine with which I am familiar, averages .040″ between the base and the center of the shaft. This means that each time the turbine is started into operation and shut down the parts will expand and contract by that amount. To compensate for the effects of temperature changes, means must be provided which will permit the packings to change their positions. To this end each ring is provided with a friction device comprising in the present instance a flat piece of spring metal 24 made in the form of a corrugated ring and secured rigidly at several places to the ring holder 5. This ring engages the perpendicular adjacent wall of the containing chamber and the friction created thereby is sufficient to hold the ring in the position to which it is moved but does not offer any substantial opposition to said movement. As a result, when the position of the casing changes the shaft or a part mounted thereon will first close up the clearance and thereafter strike the packing ring and move it and its holder by a slight amount; this action taking place from time to time until the parts occupy normal positions with respect to each other. In cooling the parts move in the reverse direction. The direct movement of the rings is, of course, brought about by the shaft delivering successive blows thereto. The rings must from the nature and relation of the parts and the causes for the change in position of the parts, move from one position, the cold for example, to the other, the hot, by successive steps instead of the entire movement being accomplished in one step. The friction means referred to permits of this and also holds the ring in the various intermediate positions between movements. To state the matter in another way, each ring is provided with a friction means that is capable of sustaining it wherever it is put and which of itself exerts no tendency to move it with respect to the shaft.

My invention is shown in connection with a turbine of the Curtis type, but it may also be used with other types.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, an arch bound ring for reducing leakage, a divided holder therefor that covers both sides of the ring, a means for normally supporting the ring so that there will be a free but small space at all points between its bore and the part to be packed, and a friction device that tends to hold the ring in any position to which it may be moved by said part.

2. In combination, a divided arch bound ring for reducing leakage, a holder therefor, a housing for the holder, a spring for supporting the weight of the ring and holder so as to maintain an annular clearance between the ring and the part to be packed, and a friction means that tends to hold the ring in any position to which it may be moved, the said means acting on the ring at a number of points.

3. In a leakage reducing device, the combination of a divided arch bound ring whose bore is slightly larger than the part which extends therethrough and is to be packed, a housing containing a chamber in which the ring is located, and springs which serve to centralize the ring with respect to the said part and are under initial stress, one of said springs supporting the weight of the ring and being under greater stress than the remainder.

4. In a leakage reducing device, the combination of an arch bound ring, a housing containing a chamber in which the ring is located, a spring that normally supports the ring, and means normally inactive for assuming the support of the ring when the spring is injured.

5. In a leakage reducing device, the combination of an arch bound ring arranged to be moved in a plane perpendicular to the axis of its bore, a housing containing a chamber in which the ring is located, springs that support and tend to centralize the ring, and means for preventing the ring from rotating.

6. In a leakage reducing device, the combination of a divided ring arranged to be moved in a plane perpendicular to the axis of its bore, the parts of the ring being fixed with respect to each other, a housing containing a chamber in which the ring is located, springs that support and tend to centralize the ring, means for preventing the ring from rotating, and a friction means that holds the ring against the action of the springs.

7. A leakage reducing device comprising a divided holder with segmental arch bound pieces of carbon over which the holder is shrunk, and means for uniting the parts of the holder.

In witness whereof, I have hereunto set my hand this 23rd day of March, 1909.

FREDERIC R. C. BOYD.

Witnesses:
DUGALD McK. McKILLOP,
CHARLES A. BARNARD.